(12) United States Patent
Taylor et al.

(10) Patent No.: US 7,472,088 B2
(45) Date of Patent: Dec. 30, 2008

(54) SYSTEM AND METHOD FOR OFFERING A FINANCIAL PRODUCT

(75) Inventors: James W. Taylor, New Hyde Park, NY (US); Luz-Maria Coro, Edo. de México (MX)

(73) Assignee: JPMorgan Chase Bank N.A., New York, NY (US)

( * ) Notice: Subject to any disclaimer, the term of this patent is extended or adjusted under 35 U.S.C. 154(b) by 1351 days.

(21) Appl. No.: 09/872,447

(22) Filed: Jun. 1, 2001

(65) Prior Publication Data

US 2002/0147669 A1  Oct. 10, 2002

Related U.S. Application Data

(60) Provisional application No. 60/262,960, filed on Jan. 19, 2001.

(51) Int. Cl.
*G06Q 40/00* (2006.01)
(52) U.S. Cl. .......................................... 705/38; 705/35
(58) Field of Classification Search ............... 705/36 R, 705/15–17, 14, 5, 35, 38; 726/3–21; 902/9–21
See application file for complete search history.

(56) References Cited

U.S. PATENT DOCUMENTS

| | | | |
|---|---|---|---|
| 3,316,395 A | 4/1967 | Lavin | |
| 3,634,669 A | 1/1971 | Wykcoff et al. | |
| 4,254,474 A | 3/1981 | Cooper et al. | |
| 4,594,663 A | 6/1986 | Hirayama | |
| 4,598,367 A | 7/1986 | DeFrancesco et al. | |
| 4,642,768 A | 2/1987 | Roberts | |
| 4,736,294 A | 4/1988 | Le Grand | |

(Continued)

FOREIGN PATENT DOCUMENTS

WO    WO/0026831    5/2000

(Continued)

OTHER PUBLICATIONS

"Online Business Computer Applicatns", by Alan Eliason, 2$^{nd}$ edition, copyright 1987, ISBN: 0-02-332461-9 (5 pages attached).*

(Continued)

*Primary Examiner*—James P. Trammeli
*Assistant Examiner*—Kirsten Sachwitz Apple
(74) *Attorney, Agent, or Firm*—Goodwin Procter LLP (57) ABSTRACT

A system and method for offering a financial product to a customer in real-time while the customer is conducting a transaction over a network. In response to received identification information regarding the customer over the network, the present system and method retrieves data related to the identification information, determines if the customer qualifies to receive an offer of the financial product in response to the retrieved data, and then offers the financial product to the customer if the customer qualifies. If the customer accepts the offer of the financial product, the financial product is made immediately usable by the customer. This entire process is performed while the customer is conducting a transaction on-line or via telephone. In other words, the process is conducted in real-time. Because the determination of the qualification for an offer is conducted in real-time, the back-end process required to re-check the customer's credit data before approving the offer is eliminated.

67 Claims, 3 Drawing Sheets

U.S. PATENT DOCUMENTS

| | | | |
|---|---|---|---|
| 4,739,478 A | 4/1988 | Roberts et al. |
| 4,760,604 A | 7/1988 | Cooper et al. |
| 4,812,628 A | 3/1989 | Boston |
| 4,831,526 A | 5/1989 | Luchs |
| 4,866,634 A | 9/1989 | Reboh |
| 4,897,811 A | 1/1990 | Scofield |
| 4,914,587 A | 4/1990 | Clouse |
| 4,964,043 A | 10/1990 | Galvin |
| 5,054,096 A | 10/1991 | Beizer |
| 5,206,803 A | 4/1993 | Vitagliano |
| 5,220,500 A | 6/1993 | Baird et al. |
| 5,227,874 A | 7/1993 | Von Kohorn |
| 5,231,571 A | 7/1993 | D'Agostino |
| 5,239,462 A | 8/1993 | Jones |
| 5,262,941 A | 11/1993 | Saladin |
| 5,274,547 A | 12/1993 | Zoffel |
| 5,278,751 A | 1/1994 | Adiano et al. |
| 5,321,841 A | 6/1994 | East et al. |
| 5,424,938 A | 6/1995 | Wagner |
| 5,444,844 A | 8/1995 | Inoue et al. |
| 5,481,647 A | 1/1996 | Brody et al. |
| 5,523,942 A | 6/1996 | Tyler et al. |
| 5,537,315 A | 7/1996 | Mitcham |
| 5,550,734 A | 8/1996 | Tater |
| 5,551,021 A | 8/1996 | Harada et al. |
| 5,569,897 A | 10/1996 | Masuda |
| 5,606,496 A | 2/1997 | D'Agostino |
| 5,611,052 A | 3/1997 | Dykstra |
| 5,644,493 A | 7/1997 | Motai et al. |
| 5,649,116 A | 7/1997 | McCoy et al. |
| 5,655,085 A | 8/1997 | Ryan |
| 5,664,115 A | 9/1997 | Fraser |
| 5,689,649 A | 11/1997 | Altman et al. |
| 5,696,907 A | 12/1997 | Tom |
| 5,699,527 A | 12/1997 | Davidson |
| 5,701,400 A | 12/1997 | Amado |
| 5,715,402 A | 2/1998 | Popolo |
| 5,717,865 A | 2/1998 | Stratmann |
| 5,732,397 A | 3/1998 | DeTore et al. |
| 5,742,775 A | 4/1998 | King |
| 5,758,328 A | 5/1998 | Giovannoli |
| 5,765,144 A | 6/1998 | Larche |
| 5,774,882 A | 6/1998 | Keen |
| 5,774,883 A | 6/1998 | Andersen et al. |
| 5,794,207 A | 8/1998 | Walker et al. |
| 5,797,133 A | 8/1998 | Jones |
| 5,802,502 A | 9/1998 | Gell et al. |
| 5,809,478 A | 9/1998 | Greco |
| 5,815,683 A | 9/1998 | Volger |
| 5,832,447 A | 11/1998 | Rieker et al. |
| 5,838,906 A | 11/1998 | Doyle et al. |
| 5,842,178 A | 11/1998 | Giovannoli |
| 5,844,553 A | 12/1998 | Hao et al. |
| 5,845,256 A | 12/1998 | Pescitelli |
| 5,848,427 A | 12/1998 | Hyodo |
| 5,862,223 A | 1/1999 | Walker et al. |
| 5,870,721 A | 2/1999 | Norris |
| 5,870,723 A | 2/1999 | Pare |
| 5,873,096 A | 2/1999 | Lim |
| 5,878,403 A | 3/1999 | DeFrancesco et al. |
| 5,920,848 A | 7/1999 | Schutzer et al. |
| 5,926,800 A | 7/1999 | Baronowski |
| 5,930,764 A | 7/1999 | Melchione |
| 5,930,775 A | 7/1999 | McCauley et al. |
| 5,930,776 A | 7/1999 | Dykstra |
| 5,940,811 A | 8/1999 | Norris |
| 5,940,812 A | 8/1999 | Tengel et al. |
| 5,963,953 A | 10/1999 | Cram et al. |
| 5,966,699 A | 10/1999 | Zandi |
| 5,970,482 A | 10/1999 | Pham |
| 5,970,483 A | 10/1999 | Evans |
| 5,983,206 A | 11/1999 | Oppenheimer |
| 5,987,434 A | 11/1999 | Libman |
| 5,987,436 A | 11/1999 | Halbrook |
| 5,991,750 A | 11/1999 | Watson |
| 5,995,947 A | 11/1999 | Fraser |
| 6,012,044 A | 1/2000 | Maggioncalda et al. |
| 6,014,645 A | 1/2000 | Cunningham |
| 6,014,646 A | 1/2000 | Vallee et al. |
| 6,029,149 A | 2/2000 | Dykstra |
| 6,032,137 A | 2/2000 | Hallard |
| 6,055,517 A | 4/2000 | Friend et al. |
| 6,078,905 A | 6/2000 | Pick-Le Winter |
| 6,088,686 A | 7/2000 | Walker et al. |
| 6,105,007 A | 8/2000 | Norris |
| 6,108,644 A | 8/2000 | Goldschlag et al. |
| 6,112,190 A | 8/2000 | Fletcher et al. |
| 6,128,603 A | 10/2000 | Dent et al. |
| 6,134,530 A | 10/2000 | Bunting et al. |
| 6,135,349 A | 10/2000 | Zirkel |
| 6,144,948 A | 11/2000 | Walker et al. |
| 6,167,383 A | 12/2000 | Henson |
| 6,185,543 B1 | 2/2001 | Galperin et al. |
| 6,208,979 B1 | 3/2001 | Sinclair |
| 6,216,115 B1 | 4/2001 | Barrameda et al. |
| 6,249,775 B1 | 6/2001 | Freeman et al. |
| 6,260,026 B1 | 7/2001 | Tomida et al. |
| 6,272,528 B1 | 8/2001 | Cullen et al. |
| 6,311,169 B2 | 10/2001 | Duhon |
| 6,324,524 B1 | 11/2001 | Lent et al. |
| 6,339,766 B1 | 1/2002 | Gephardt |
| 6,343,279 B1 | 1/2002 | Bissonette et al. |
| 6,374,230 B1 | 4/2002 | Walker et al. |
| 6,385,594 B1 | 5/2002 | Lebda et al. |
| 6,405,181 B2 | 6/2002 | Lent et al. |
| 6,502,080 B1 | 12/2002 | Eichorst et al. |
| 6,529,187 B1 | 3/2003 | Dickelman |
| 6,556,979 B1 | 4/2003 | Liu et al. |
| 6,567,791 B2 | 5/2003 | Lent et al. |
| 6,578,761 B1 | 6/2003 | Spector |
| 6,601,034 B1 | 7/2003 | Honarvar et al. |
| 6,805,287 B2 | 10/2004 | Bishop |
| 2003/0046222 A1 | 3/2003 | Bard et al. |
| 2003/0046223 A1 | 3/2003 | Crawford et al. |
| 2003/0101133 A1 | 5/2003 | DeFrancesco, Jr. et al. |
| 2003/0120586 A1 | 6/2003 | Litty |
| 2003/0135448 A1 | 7/2003 | Aguias et al. |
| 2003/0135449 A1 | 7/2003 | Xu et al. |
| 2003/0135450 A1 | 7/2003 | Aguais et al. |
| 2003/0140000 A1 | 7/2003 | Lee |
| 2003/0176931 A1 | 9/2003 | Pednault et al. |
| 2003/0195840 A1 | 10/2003 | Xu |
| 2003/0229582 A1 | 12/2003 | Sherman et al. |
| 2004/0044615 A1 | 3/2004 | Xue et al. |
| 2005/0097036 A1 | 5/2005 | White et al. |

FOREIGN PATENT DOCUMENTS

| | | |
|---|---|---|
| WO | WO/0026832 | 5/2000 |
| WO | WO/0026833 | 5/2000 |
| WO | WO 02/03226 | 1/2002 |

OTHER PUBLICATIONS

Hickman et al., An Evolutionary Leap in Credit Portfolio Risk Modeling, Dec. 18, 2002.

Automated Capture for Forms & Documents, Cardiff Teleform Elite, copyright 1991-2000.

Anonymous, Car Loans in Minutes, Bank Management, vol. 64, No. 4, Apr, 1, 1993.

Credit Line Optimization, A Marketswitch Paper, Marketswitch Corporation, www.marketswitch.com, copyright 2002, 6 pps.

Credit Score Accuracy and Implications for Consumers, Consumer Federation of America National Credit Rep, Dec. 17, 2002.

Fast Start Scoring Models, Scorex, http://www.Scores.com/us/home.html, copyright 2003, Jun. 25, 2005.

Banasiak, Integrating Predictive Scoring Technology, 12th Annual Credit Card Collections Conference, Oct. 15-Oct. 17, 2003.

NAESB-SUIS Creditworthiness Principles Draft #1, NAESB-SUIS, Dec. 9, 2002.

Hubbard et al., NextGen FICO Scores: More Predictive Power in Account Management, A Fair Isaac Paper, Sep. 1, 2001.

Scorex Launches New Credit Line Optimization Consulting Service, Sorex, Press Release, Oct. 27, 2003.

Strategy Science Executive Brief, Fair Isaac, copyright Jun. 2003, Jun. 1, 2003.

Triad Adaptive Control System-Version 7, Fair Isaac, copyright 2003, Jun. 25, 2005.

Paradi et al., Using DEA and Negative DEA in Credit Risk Evaluation, Journal of Productivity Analysis, vol. 21, 2004, pp. 153-165.

Abstract of Article entitled: "Boscov's Converts Checkwriters to Cardholders," Patricia A. Murphy, Stores, V78 n6, pp. 62-63, Jun. 1996.

Abstract of Article entitled: "A High-Stakes Card Game" Linda Punch, Financial Services Online, V5, n1, p. 44+, Nov. 1999.

News Release: Equifax Unvils "Decision Power(sm)-Retail", Apr. 2, 1996.

* cited by examiner

SYSTEM AND METHOD FOR OFFERING A FINANCIAL PRODUCT

CROSS-REFERENCE TO RELATED APPLICATIONS

This application is based on and claims priority to U.S. Provisional Patent Application No. 60/262,960, filed Jan. 19, 2001, and of the same title, the entire disclosure of which is hereby incorporated by reference.

FIELD OF THE INVENTION

The present invention relates to systems and methods for marketing financial products and services and more particularly to a system and method for determining, in real-time, whether a customer qualifies for an offer of a financial product.

BACKGROUND OF THE INVENTION

Direct mail remains the primary marketing channel for providers of consumer related services such as credit card issuers, mortgage providers, insurance companies, auto financing companies, and retail and private banking institutions. Although the present discussion will focus primarily on the issuers of credit cards, the present invention is applicable to any of the above industries without limitation.

The goal of direct mail marketing is to identify and contact potential customers and to present those customers with offers which will hopefully turn them from potential into actual customers. For the credit card industry alone, it is estimated that credit card solicitations for year ending 1997 reached an annual rate of 3.5 billion offers per year. This represented an increase of approximately 29% over the number of solicitations made in 1996. Unfortunately, the net response rates across the industry have declined by 26% over the past two years and the average cost per booked account has increased by 45% over the same period. These last two facts highlight the need for new methods and systems for offering these financial products.

Figure 1:
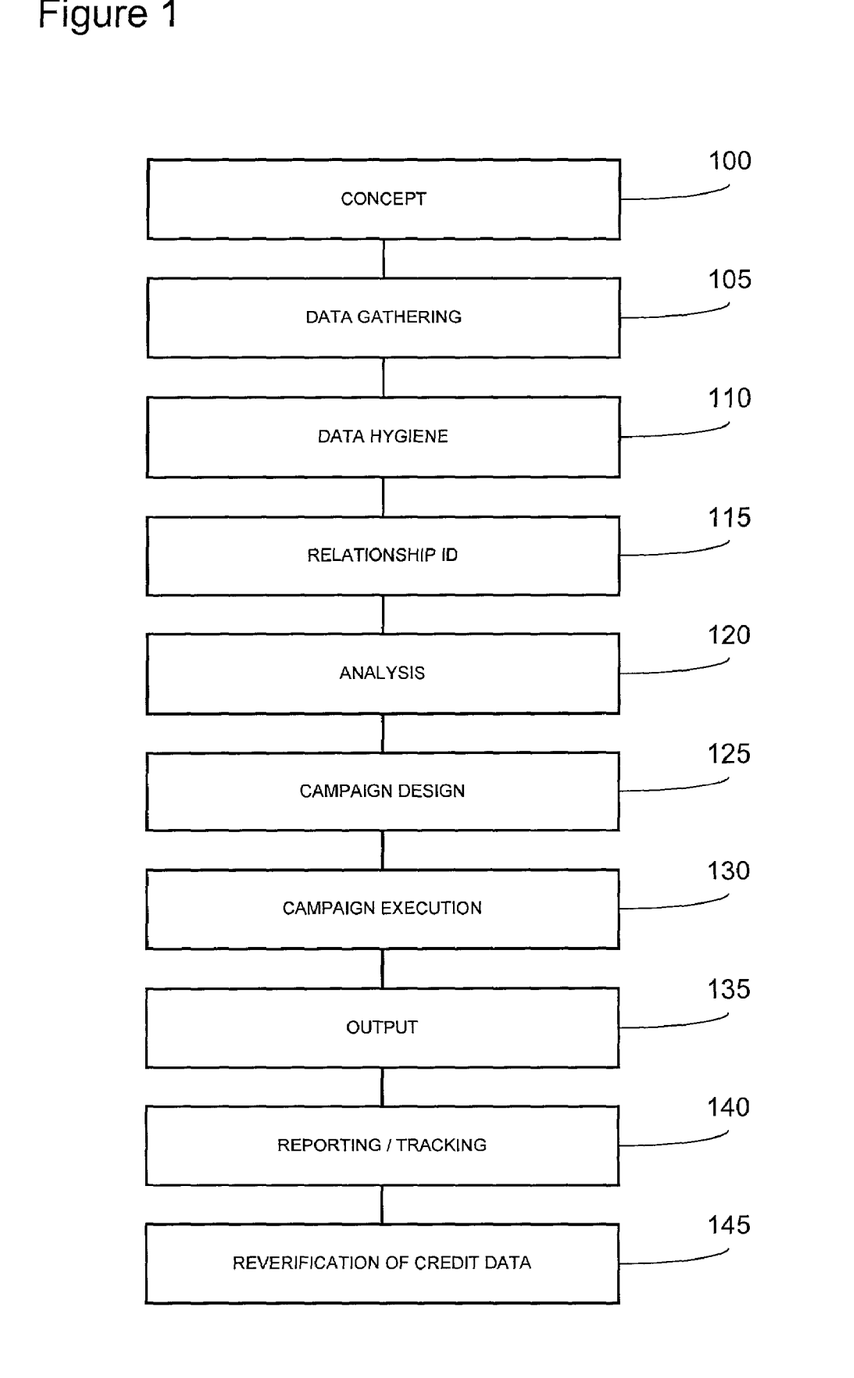
FIG. 1 illustrates the prior art linear direct mail processing.

A prior art process for generating a direct mailing is depicted in FIG. 1. As seen in this Figure, the process is a linear one, in which a subsequent processing step cannot begin (or at least complete) until the prior processing step has been completed. In step 100 of the prior art process, the concept for the direct mailing is developed. This step 100 could include, for example, identifying new products (e.g., a new interest rate credit card) for marketing to potential customers. The next step in the process is gathering data regarding the potential consumers to be targeted by the direct mailing. In regard to credit card marketing, the single largest source of data with respect to potential customers is from one or more Credit Bureaus. Presently there are three Credit Bureaus in the United States, Transunion, Experian and Equifax, from which data on consumers can be purchased. Other sources of data include demographic data from, for example, magazine subscription companies, mortgage companies or catalog companies. Once the data on potential customers had been gathered in step 105, it is "cleaned" in step 110. Such "cleaning" includes eliminating duplicate data and eliminating incomplete data.

Step 115, entitled Relationship ID, entails identifying and/or establishing relationships between the records in the database. For example, this step 115 could include identifying households with one or more consumers. Once the database has been gathered, cleaned-up and the proper relationships have been identified, Analysis and Campaign Design occurs in steps 120 and 125 respectively. The analysis of the raw data and the objectives of the goals of the direct mail campaign leads to the actual design of the campaign. The actual design will typically be in a tree type structure which starts off with broad categories, such as which credit card products to promote. The next level in the design tree might be the different types of terms available on each of the credit cards. A final level in the tree, the "leaves", might be the color of the actual envelope which is to be sent to certain groups of potential consumers. The leaves of the design tree are also sometimes called the market cell. The targeted consumers in the market cell have some common core of attributes (e.g., income and geographic location) in common which allow them to be grouped together for specific marketing (i.e., targeting).

Once the design of the campaign has been completed in step 125, it is executed and output in steps 130 and 135. Execution in step 130 involves the physical compilation and assembly of all of the materials to be included in the offers to the potential consumers. Output in step 135, as implied, involves the actual mailing of the marketing materials. Once the campaign is in progress, an extremely important step 140 is the reporting and tracking of the progress of the campaign. Essentially, this step 140 involves tracking which consumers responded positively to the direct mailing.

The reporting and tracking of the campaign typically takes place over a number of months because the direct mailings typically include an expiration date, after which the offer is no longer valid. Of the consumers which have responded positively to the direct mailing, there is still a further step in the process. Due to the time between developing the campaign and the receipt of a positive response thereto, the positive response could have been received anywhere between one to three months, or possibly even six months, after the original data from the Credit Bureau was checked. Because of this time lag, a consumer who has indicated interest in accepting the offer detailed in the direct mailing will have his/her credit information rechecked with the Credit Bureau data at step 145 to determine if that particular consumer's financial situation has changed between the time of the previous data check. This involves obtaining data for that particular consumer from the Credit Bureau again, and re-verifying that data to make sure the consumer has not, for example, declared bankruptcy within the time period between the last review of the Credit Bureau data and the acceptance of the mailed offer. This step ensures that the offeror of the direct mailing will not extend credit to higher risk prospects.

Although the process depicted in FIG. 1 has worked for years, its biggest drawback is the back-end process of rechecking the credit data of the consumers who have positively responded to the direct mailings. Also, the prior art process, because of the time constraints and volumes of data involved, does not easily lend itself to personalized offers made specifically for a particular consumer based on their data, but rather only facilitates general offerings to groups of individuals with similar financial/demographic data. Further, because of the time required to gather, clean and index (relationship ID) the raw data, and the additional time required to execute and output the campaign, approximately only four days are available to complete the most important aspects of the process, the analysis and design steps.

Another system for pre-screening a customer for a proprietary credit card (i.e., a department store credit card) has been developed and implemented by Equifax. This system operates within the department store when a customer writes a check towards the purchase of store items. During the check verification process, the check writer is asked for their driver's license number during the normal check approval process. While the check is being authorized, the pre-screening system, relying upon parameters programmed into the system by the department store, pre-screens the customer for the proprietary card, discerning whether the check writer already has the proprietary card, has been offered one recently, and qualifies for a proprietary card. If the check writer qualifies and has not already been offered a card, the system prompts the sales person to suggest one to the check writer. If the check writer chooses to accept the proprietary card, they are given a temporary card and are free to charge purchases onto the that card.

There are, however, certain drawbacks and disadvantages to this system. First, since the system relies upon the customer to first write a check towards the purchase of an item, this system is only usable within the store itself and not in an electronic, or on-line, environment. Also, because a check must first be written, the customer will typically not destroy the check in favor of purchasing the item(s) for which the check was written on the temporary credit card. This is a major drawback to this system because the issuer of the credit card (here the department store) will lose the revenue which could have been generated from the items purchased by check. Accordingly, there still remains the need to screen customers in an electronic environment to determine if they qualify for the offer of a financial product(s) and that this financial product be immediately usable by the customer.

SUMMARY OF THE INVENTION

The present invention solves the problems of the prior art systems and methods by offering a financial product to a customer in real-time while the customer is conducting a transaction, e.g., making a purchase, an account inquiry or browsing an Internet web site. Accordingly, in response to received identification information regarding the customer over a network, the present system and method retrieves data related to the identification information, determines if the customer is qualified to receive an offer of the financial product in response to the retrieved data, and then offers the financial product to the customer if the customer qualifies. This entire process is performed in parallel to the customer conducting a transaction in real-time over a network, thereby eliminating the back-end process required to re-check the customer's credit data before approving the offer. Preferably, the present system offers the financial product to the customer while they are conducting a transaction on-line or via telephone, i.e., in real-time over a network.

In the preferred embodiment, the financial product is offered to the customer while they are conducting a transaction with a web site. In this instance, the identification information is forwarded to a financial institution which then retrieves data related to the identification information and determines if the customer qualifies for an offer based on the retrieved data. If the customer qualifies, that information is relayed to the web site, which thereafter presents the offer to the customer.

The retrieval of data related to the identification information by the financial institution is conducted via a real-time link between the financial institution and a Credit Bureau and/or other internal or external financial institution databases. With this real-time link, the financial institution has immediate access to the most current data available for the customer recognized by the identification information received. This immediate access to the most current data eliminates the back-end process required to re-check the customer's credit data before approving the offer, because the offer is made in real-time and the credit information of the customer is unlikely to change within this relatively short time period.

The financial product offered may include at least one of a credit card, an overdraft product, a mortgage, a mortgage refinancing, an auto loan, a student loan, a personal loan, insurance, a home equity loan, a credit line extension, margin lending products for the purchase of stocks, bonds, etc., or one or more financial product packages which may contain at least one of a credit card, an overdraft product, a mortgage, a mortgage refinancing, a tax grievance, an auto loan, a student loan, a personal loan, insurance, a home equity loan, a credit line extension or margin lending products for the purchase of stocks, bonds, etc.,.

Because the present invention determines whether a customer qualifies for an offer in real-time, the back-end process required to re-check the customer's credit data before approving the offer is eliminated.

Also, the present system and method, because of its real-time qualification analysis, enables the immediate use of the financial product offered to the customer if the customer decides to accept the offer.

BRIEF DESCRIPTION OF THE DRAWINGS

For the purpose of illustrating the invention, there is shown in the drawings a form which is presently preferred, it being understood, however, that the invention is not limited to the precise arrangement and instrumentality shown, wherein.

DETAILED DESCRIPTION OF THE INVENTION

The present invention will now be described with reference to a system and method of offering a credit card to a customer. It should be noted, however, that the present invention is not limited to the offer of a credit card, and that other financial products, such as an overdraft product, a mortgage, a mortgage refinancing, an auto loan, a student loan, a personal loan, insurance, a home equity loan, a credit line extension, margin lending products for the purchase of stocks, bonds, etc., a business loan, a business credit card, a benefits package, an escrow account or a payroll account can be offered with the present system and method. Also, the customer to whom the offer is made can be an individual or a business.

Figure 2:
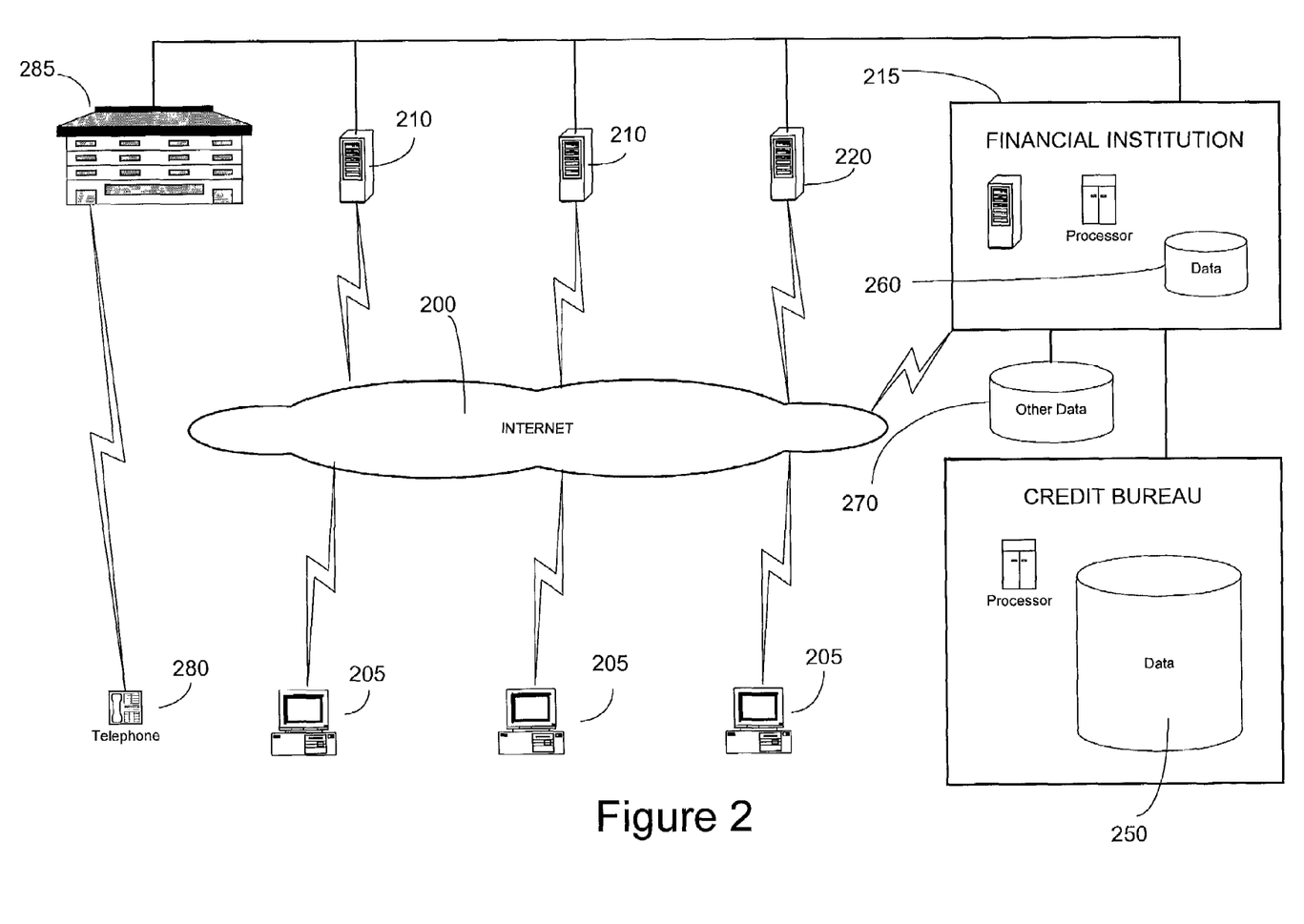
FIG. 2 is a high level block diagram of the overall system of the present invention.

In the preferred embodiment, as shown in FIG. 2, the customer first logs onto the Internet 200 and accesses a web site to conduct a transaction, typically the purchase of an item, or simply to browse the web site content. Preferably, the web site is a financial institution web site 215, wherein the customer may be interested in specific financial products or services, a merchant web site 210, wherein the customer may be interested in the purchase of specific products or services, or any other web site 220 which offers products or services.

With any type of web site, the customer, when purchasing a desired product or service, enters certain identifying information specific to that customer. This identifying information may include any information that personally identifies the customer, such as, for example, their name, address, social security number, a credit card number, an account identification number and/or password or any combination thereof. Additionally, if the customer is simply browsing the web site content, the present system may utilize a "cookie" or any other similar computer identification tag as the identification information with which to identify the customer.

As is commonplace with use of the Internet 200, the identification information will typically be entered and forwarded to the accessed web site 210, 215 or 220 through an interface in the customer's computer 205 which is linked to the Internet 200, which, in turn, is linked to an interface for the web site 210, 215 or 220. The interface may be any interface used to access the Internet, such as a cable modem, DSL, T1, T2, telephone line, or any similar network communications link.

Figure 3:
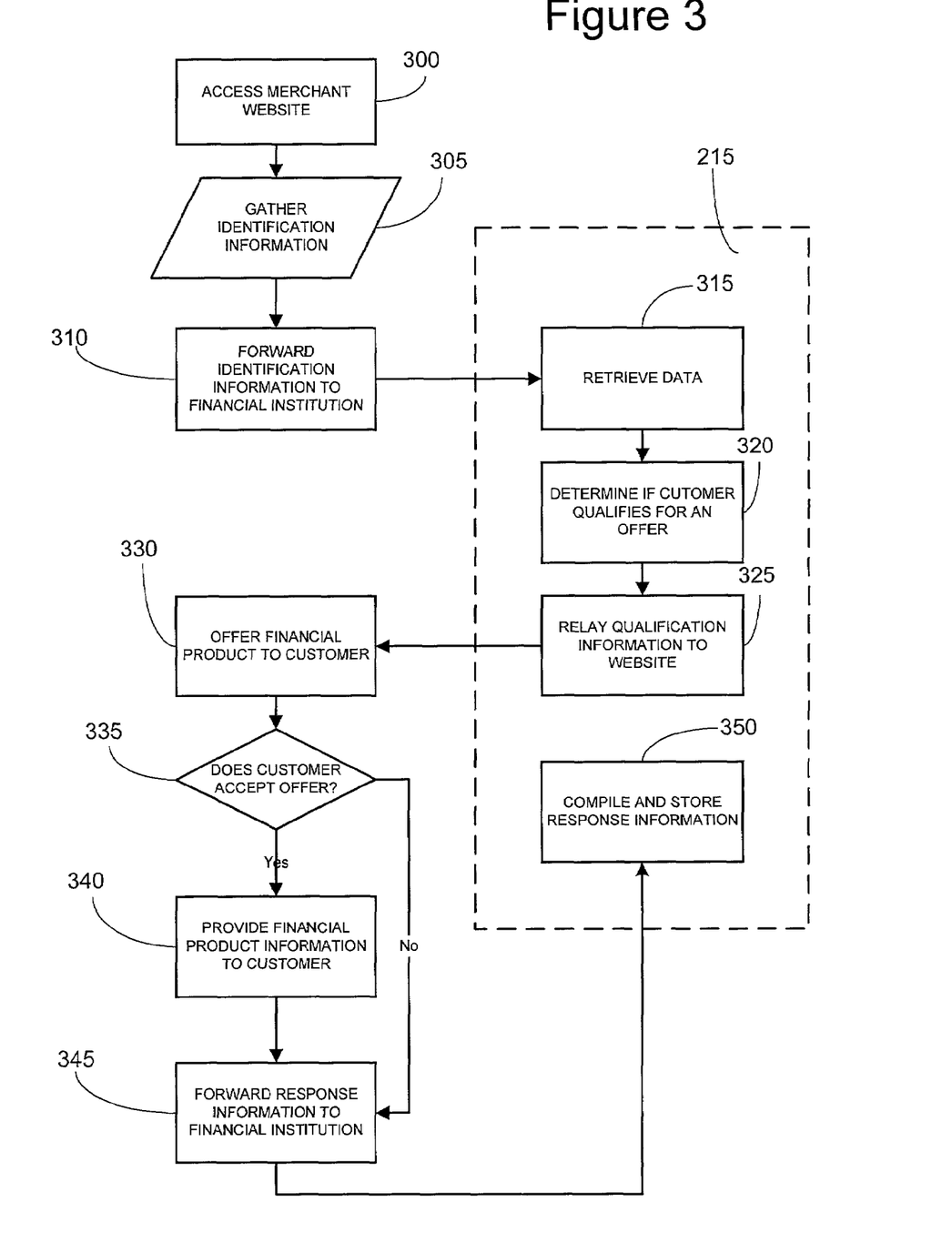
FIG. 3 depicts a high level flow diagram illustrating the preferred method of the present invention.

FIG. 3 shows the preferred embodiment of the present invention. As shown in the flowchart, the customer first accesses the merchant web site at step 300. When the customer desires to purchase any product or service from the merchant web site, the merchant web site gathers the identification information of the customer at step 305. The identification information is typically received when the customer enters the information into the appropriate locations on an electronic order form of the merchant web site. This information may include the customer's name, address, phone number, e-mail address, credit card number, or an account identification number and/or password specific to the merchant web site. Also, as stated above, if the customer is simply browsing the content of the web site, the merchant web site may identify the customer by a "cookie" or other similar computer identification tag.

In response to the received identification information, the entity maintaining the web site (i.e., a merchant), then, in real-time (i.e., when the customer is conducting the transaction over the network), forwards the identification information to the entity which is to determine if the customer qualifies for the offer of a financial product at step 310. Typically, the entity which determines the qualifications of the customer will be a financial institution 215, such as a bank, credit union, savings and loan organization, or the like. It is contemplated that the merchant web site may be connected to the entity which determines the qualifications of the customer via a dedicated network connection or a dial-up network connection.

In an alternate embodiment, the present invention, however, can eliminate the use of a merchant web site if the customer directly accesses the web site of a financial institution 215. In this instance, the financial institution will directly receive the relevant identification information from the customer over the network.

With either situation, after the financial institution 215 receives the customer's identification information over the network connection, it retrieves data at step 315 which is related to the identification information of the customer from a database 250 (FIG. 2). This retrieval of data related to the identification information occurs in real-time while the customer is conducting the transaction, e.g., buying products on the merchant web site 210. In other words, the retrieval of data by the financial institution 215 occurs in parallel to the transaction being conducted by the customer, such that the retrieval of data is seamless and not customer interactive.

Typically, the database 250 will be maintained and compiled by an external source, such as one or more Credit Bureaus. Presently there are three Credit Bureaus in the United States, Transunion, Experian and Equifax, from which data on consumers can be purchased. The financial institution 215 accesses the database 250 in real-time by a suitable communications link, wherein the data contained therein is queried and retrieved based on the customer's identification information. The querying and retrieval of the data based on the customer's identification information will typically be accomplished by sending a request to the Credit Bureau with the required criteria to be applied to the data so that the Credit Bureau can query their database and return the results back to the financial institution. These results will typically be in the form of a FICO score. However, it is also contemplated that the financial institution can have direct access to the Credit Bureau database to perform their own query of the data contained therein.

It is also contemplated, however, that additional internal databases, such as that shown at 260 in FIG. 2, which are operated by the financial institution 215 may be used in the qualification process. Additionally, the data retrieved as a result of the received identification information can come from a combination of internal and external databases, such as those indicated at 250, 260 and 270 in FIG. 2, so that data other than credit related data can be utilized to determine if the customer qualifies for the offer of a financial product(s).

The data in an external Credit Bureau database 250 typically falls into categories which reflect the credit history/rating of a particular person/business and includes different attributes relating to each customer (such as, for example, scores, delinquency, credit activity, credit line, credit history, and non-bankcard information), data used to eliminate or specially tag certain records from the database for one reason or another (such as, for example, records reflecting people who have recently died or those who have indicated that they do not wish to be contacted for any promotional purposes (Do Not Solicit/Pander) and other negative information such as entities which are suspected of fraud or have other such derogatory information). Table 1 contains a sample of some of the data contained in the database 250.

TABLE 1

| SUB-CATEGORY | DATA ELEMENT |
| --- | --- |
| SCORES | Response Score |
|  | FICO II PreScore |
|  | Valuation Score |
|  | Score |
|  | Bureau Level |
|  | Sub Bureau Level |
|  | Classic Qualification |
|  | Response Score |
|  | Segmentation Scheme |
|  | Risk Score |
|  | Bankcard Revenue Score |
| DELINQUENCY | # of 12+ Days > 24 Months (Level F) |
|  | # of 30 Days > 6 Months (Level A) |
|  | # of 30+ Days in 12 Months |
|  | # of 60 Days > 24 Months (Level A) |
|  | # of 60 Days > 6 and <= 24 Months (Level B) |
|  | # of 90 Days > 24 Months (Level B) |
|  | # of 90+ Days in 24 Months |
|  | # of Charge-offs (Level A) |
|  | # of Collection Inquiries (Level A) |
|  | # of Collection Items |

TABLE 1-continued

| SUB-CATEGORY | DATA ELEMENT |
|---|---|
| | # of Current 30 Days <= 6 Months (Level A) |
| | # of Hist. 60 DPD > 12 Months (Level A) |
| | # of Hist. 60 DPD > 24 Months (Level A) |
| | # of Installment 30+ Days in 6 Months |
| | # of Liens, Judgments, Garnishments (Level F) |
| | Months Since Most Recent Delq on Bank Revolving Trade |
| | Number of 30 DPD <= 12 Months |
| | Times 30 DPD on Revolving Trades Last 7–12 Months |
| | Times 60 DPD on Retail Revolving Trades Last 2–6 Months |
| | Worst Revolving Trade Delq. Reported Last 2–6 Months |
| | Bankruptcy Info (#, Dates and amounts) |
| | Public Record Attributes (#, Dates and amounts) |
| CREDIT ACTIVITY | # of Active Bankcards |
| | # of New Bankcards Opened <= 6 Months |
| | # of Open Joint Trades Lines |
| | # of Open Revolving Trades |
| | # of Open Trade Lines Updated <= 12 Months |
| | # of Satisfactory Installment Trades Reptd Last 12 Months |
| | # of Trades Opened in 6 Months |
| | # of Updated in 3 Months with a Balance |
| | # of Updated in 6 Mos. Open 6 Mos. With a Bal. |
| | Average Balance - Active Bankcards |
| | Maximum Balance - Revolving Trades |
| | Most Recent Open Date Bankcards (Mos. from Run Date) |
| | Number of Revolving Trades Paid Out Last 12 Months |
| | Number of Satisfactory Trades Rptd Last 12 Mos. |
| | Total # of Bankcard Lines |
| | Total Balance - All Open Trades |
| | Total Balances - All Lines (excl. Mortgages) |
| | Total Balances - Bankcards |
| | Total Balances on all Revolving Trades |
| | Total Open to Buy Bankcards |
| | Total Open Trades |
| | Total Revolving Debt |
| | # of SAT Bank/Savings or National Trades |
| CREDIT LINE | # of Bank/S&L w/Credit Line >$5,000 |
| | Highest Bankcard Line |
| | Highest High Credit Line - Bank/S&L Revolving <$15,000 |
| | Highest High Credit Line - Bank/S&L Revolving |
| | Total Util on Revolving Trades Rptd Last 24 Mos. |
| | Total Util on Rev & Retail Trades Rptd Last 12 Months |
| | Utilization on Bank/S&L Trades |
| | Utilization on Open Trades |
| | Utilization on Revolving Trades in 12 Months |
| | Utilization on Revolving Trades in 24 Months |
| | Total Credit Limit - All Lines |
| | Total Credit Line - Retail Revolving |
| | Total Credit Limit - Revolving Lines |
| | Total Credit line - Bank/S&L Revolving |
| CREDIT HISTORY | # of SAT 6 Months or Older |
| | Age of Oldest Revolving Trade |
| | Age of Oldest Trade (match Level B criteria topic) |
| | Age of Newest Revolving Trade |
| | Earliest Open Date Bankcards (Months from Run Date) |
| | Total Months on File |
| NON-BANKCARD | Number of Oil Company Cards |
| | Number of Personal Finance Company Trades |
| ACCOUNTS | Number of Retail Trades |
| | # of Mortgage Trades |
| | Dates of Latest Mortgage Trade |
| | # of Auto Loans |
| | Total Retail Cards |
| INQUIRIES | # of Non Promotional Inquiries |
| | # of Non-Promo Inquiries <= 6 Months w/o Auto |
| | # of Non-Promo Inquiries <= 6 Months |
| | Number of Non-Promo Inquiries in Last 6 Mos. |
| | Number of Non-Promo Inquiries Last 13–24 Months |
| | Solo, Smart, Ace |
| CREDIT LINE | Highest High Credit Line - Bank/S&L Revolving <$15,000 |
| CREDIT HISTORY | Average months on file for all trades |
| OTHER | Date of CB Database Extract |

The second broad type of data contained in either the same external database 250, a different external database 270 and/or an internal database 260 is Other Data and consists of files containing Demographic Data, List Data and Partner Data, to name a few.

The Demographic Data may be obtained from a number of commercial providers of such data such as Donnelley, Polk or Metromail. Major subcategories of Demographic Data include address information, home ownership, income, household makeup, phone numbers, automobile information, cluster codes, and lifestyle information. Table 2 contains a sample of the types of Demographic Data which may be retrieved. In general, demographic data is life event oriented in nature, e.g., purchase of a new home.

TABLE 2

| SUBCATEGORY | DATA ELEMENT |
| --- | --- |
| RESIDENCE | Dwelling Unit Size |
| | Length of Residence |
| | Current Assessed Value |
| | Mortgage Amount |
| | Loan Type |
| | Loan to Value Ratio |
| | Single v. Multi Family Dwelling |
| | Median Home Value |
| INCOME | New Income Code |
| | Estimated Household Income |
| | Median Family Income |
| | Average Household Income |
| | Census Median Household Income |
| HOUSEHOLD MAKEUP | Presence of Children |
| | Marital Status |
| | Occupation Code |
| | Gender of Head of Household |
| | Adult Ages |
| | Number of Children |
| | Children Age Ranges |
| | Number of Adults |
| | Number of Persons |
| AUTOMOBILE | Number of Vehicles Owned |
| | Value of Vehicles Owned |
| | New Vehicle Purchaser |
| | Recreational Vehicle Ownership |
| LIFESTYLE | Credit Card Users |
| | Mail Order Buyers |
| | Mail Order Responders |
| | Education |
| | Median Years School Completed |

The second category of Other Data is List Data. There are almost an unlimited number of sources of list type data available. The number and types of lists used by an organization employing the present invention will vary greatly depending on the goals of the organization. In a preferred embodiment of the present invention, credit card offering, the following broad categories of lists are used: retail vertical lists; ethnic vertical lists; lifestyle lists and summary information. The summary information includes the source of list and other data regarding the nature of the list. Table 3 contains a representative sampling of the types of lists which can be used in determining whether a customer receives an offer of a financial product.

TABLE 3

| SUBCATEGORY | LIST |
| --- | --- |
| RETAIL VERTICAL LISTS | Bloomingdales ® Credit Card Buy |
| | Chadwick's of Boston ® Enh. Buy |
| | Hosiery Corp. of Amer. ® Buy/Resp. |
| | J. Crew ® Enhanced Mail Order Buy |
| | NewBridge Book Club ® Master |

TABLE 3-continued

| SUBCATEGORY | LIST |
| --- | --- |
| | Pace Entertainment ® |
| | Lillian Vernon ® Buyers |
| | Old Pueblo Traders Apparel ® |
| | Warshawsky Whitney ® Enhanced |
| LIFESTYLES LISTS | Leaving the Nest ® |
| | Lifestyle Selector ® - T & E |
| | Golf Magazine ® |
| | Big Blue Collar ® List |
| | Family Handyman Magazine ® |
| | Field and Stream ® |
| | Family Circle ® |
| | Lifestyle Selector-Fish, Hunt, . . . |
| | Lifestyle Selector-Home Workshop |
| COMPILED LIST | First Time Credit Card Holder |
| | TotaList masterfile |
| | Behavior Bank |
| | Carol Wright ® Catalog Buyers |

A further category of Other Data is the Partner Data. Depending on the nature of the organization practicing the present invention, it is very possible that the organization will have business partners from which it may obtain additional information about the customer. For example, an issuer of a credit card will often have brand partners. The brand partners may provide the credit card issuer with information regarding its current employees and/or customers. This type of information would go into the Partner Data file.

A further broad category of data which may be used to determine if the customer qualifies for an offer of a financial product is Internal/Historical Data which may include Response History Data and Customer Data. The Response History Data contains data reflecting previous responses to offers of financial products to the customer. The Response History Data may be used to evaluate the effectiveness of particular financial products offered in order to assist in creating more effective financial products in the future. Further, the organization determining if the customer qualifies for the offer can determine from the Response History Data if a customer should not be offered any further financial products. For example, if a customer has been offered twelve products over the past year and has never positively responded, this customer is a likely candidate not to be offered any further similar offerings if they qualify.

The other type of Internal/Historical file is the Customer Data file. This file contains internally obtained or generated data related to customers who are already customers of the organization that will be making the offer (i.e., the financial institution or the merchant). Even though these customers are already customers, the are also prospective customers for other products or services offered by the organization. The type and amount of data contained in Customer Data Files will vary on the type of organization and the variety and number of different products and services offered by the organization. For example, if the organization only offers two types of products, very little data on the current customers are required. On the other hand if the organization has a large number of products and/or services in a wide variety of fields, retention of a greater amount data on current customers is justified.

A sample of the types of information used in the preferred embodiment by credit card providers of the Customer Data file includes: account number; current credit line; membership date; date of first usage; utilization; and balances. A subcategory of Customer Data could include tracking of customers obtained directly as a result of the processes of the present invention. This long-term tracking of acquired accounts will assist in ensuring that the environment will fully support the optimization and execution of present invention.

It is further contemplated that additional data other than that mentioned above can be retrieved for purposes of determining if a customer qualifies for an offer, and for what type of offer the customer qualifies. These additional pieces of data may include the types of Internet sites the customer routinely accesses, the types of products the customer buys on the Internet, what form of payment the customer uses for purchases, etc. For example, if the customer routinely purchases airline tickets on the Internet, then this information may be useful in offering a credit card to the customer that includes accumulation of frequent flier miles in response to purchases.

Once all the data is retrieved at step 315 of FIG. 3, it is then analyzed, in real-time, to determine whether the individual qualifies for an offer of a financial product and for what type of product the individual qualifies at step 320. Whether or not the customer qualifies for the offer of a financial product will depend upon what type of products are available for offer. For example, if one of the products being offered requires that the customer have an income of $30,000 or greater, and the customer does not, that customer will not qualify for the offer of that product.

With this in mind it is contemplated that the real-time offer of the financial product may include not only a single offer for a credit card, but may include the offering of a combination of one or more of a credit card, an overdraft product, a mortgage, a mortgage refinancing, an auto loan, a student loan, a personal loan, insurance, a home equity loan, a credit line extension or margin lending products for the purchase of stocks, bonds, etc. Additionally, the offer of the financial product may include offering one or more financial product packages, wherein each of the financial product packages contain at least one of a credit card, an overdraft product, a mortgage, a mortgage refinancing, an auto loan, a student loan, a personal loan, insurance, a home equity loan, a credit line extension or margin lending products for the purchase of stocks, bonds, etc.,. For example, if the customer qualifies for variety of offers, the customer may be presented with the following choices:

| OFFER #1 | OFFER #2 | OFFER #3 |
| --- | --- | --- |
| Credit card with 0.9% APR financing for 1 year | Credit card with 0.9% APR financing for 6 months | Credit card with 0.9% APR financing for 3 months |
|  | $5,000 personal loan at 7.00% | $2,500 personal loan at 7.00% |
|  |  | $25,000 home equity loan |

As shown above, if the customer qualifies, they may be offered one or more financial products and possibly even one or more financial product packages which are customized for the customer based on the data retrieved. In other words, the customized financial product packages may be grouped into conservative, normal or flexible financial product packages. The offering and grouping of such an array of financial packages is made possible by the direct linking of the organization which determines if the customer qualifies to the credit bureau data and other data in real-time, i.e., while the customer is conducting a transaction.

The financial product packages offered to the customer may be predetermined such that they are offered to the customer if their data matches the criteria established for the offer of that package, or the financial product packages offered may be customized for each particular customer based on their data, or the financial product package offered may include both predetermined and customized packages.

As shown in FIG. 3, after the data is analyzed and it is determined if the customer qualifies for an offer, the information regarding the offer is relayed, in real-time, to the merchant web site at step 325. After receipt of the information regarding the offer, the merchant web site 215 then, in real-time before the completion of the transaction with the customer, presents the offer to the customer at step 330. The merchant web site 210, however, may be configured to be discretionary in deciding whether or not to offer the financial product to the customer. In other words, even if the customer qualifies for an offer, the merchant web site may decide not to present the customer with the offer. The merchant and the financial institution would establish business rules. Obviously, the merchant web site 210 will typically only offer the financial product to the customer if they qualify, otherwise the customer will continue conducting their transaction without ever knowing that they did not qualify for any particular offer. Also, as stated above, if the customer has accessed the financial institution 215 web site directly, the financial institution 215 will make the offer to the customer if they qualify.

Preferably, since it is determined if the customer qualifies for the offer in real-time, the customer is presented with the offer at any point before, during or after finalization of the transaction. In other words, since the qualification process occurs in parallel to the transaction, after the customer has entered their identification information into the appropriate fields of a web site order form and submitted that information to the web site, the customer may be presented with the offer before, during or after the processing of that order or before, during or after approval of the transaction. For example, if the customer decides to purchase airline tickets with a particular credit card, during the processing of that transaction, the customer may qualify for an offer of a new credit card with a lower percentage rate, and/or frequent flier mile incentives. If the customer qualifies, they may be offered the new card before finalization of the transaction. Thereafter, because of this real-time, seamless interaction, the customer can immediately decide if they want to accept the offer at step 335 or continue the transaction with their previously entered information.

If the customer decides to accept the offer, they are provided, at Step 340 in FIG. 3, with the appropriate financial product information for which to make the immediate purchase of the products or services they desire. In other words, they are given immediate use of the accepted financial product. For example, if the customer accepts the new credit card, they are provided with the account number of that card and given authorization to use the card to make transactions.

The authorization for immediate use can also be in the form of a pre-approval or commitment subject to secondary considerations before a final approval. For example, if the customer accepts the offer of a mortgage product, the offer may be a pre-approval for a mortgage of a certain amount with the final approval being subject to a title search and securing of title insurance. However, this pre-approval can also be a final approval if, for example, the customer already has a mortgage product with the financial institution offering the product.

Upon accepting or refusing the offer, the merchant web site 210 then forwards the response information at step 345 in FIG. 3, i.e., an acceptance or refusal of the offer, to the financial institution 215. Upon receipt of the response information, the financial institution 215 compiles the information and stores it in the internal database at step 350 for use in determining such things as the attractiveness of future similar offers, the types of offers which are accepted by customers with similar profiles, future offers to this particular customer, etc.

Additionally, either before or after the customer accepts the offer of the financial product, the financial institution may request additional information from the customer so as to authenticate that customer. This authentication step may simply be asking the customer to verify their social security number or any other information. Further, it is contemplated that this authentication step can be dispensed with if the identification information received from the customer is of a high integrity, such as that entered by a customer which required the use of a particular password before entry of their identification information.

As stated above, the acts of receiving the customer's identification information via the network, retrieving data related to the customer's identification information, determining whether the customer qualifies for an offer of a financial product or one or more financial product packages and the offering of the financial product to the customer occur in real-time while the customer is conducting a transaction in an electronic environment. This real-time process eliminates the back-end process of re-checking the customer's financial information.

Although the preferred embodiment described above details the offer of a credit card while a customer is shopping on-line, the offer of the financial product can be made while the customer is conducting a transaction via the telephone 280 with a merchant's store 285, as shown in FIG. 2. In this instance, either the customer enters the identification information (credit card number, social security number, etc.) via the keys on their telephone, and/or the customer service personnel enters the customer identification information into their workstation (i.e., desktop computer or electronic cash register) which is linked to the financial institution 215 to receive the identification information and qualify the customer.

As previously discussed, at any time the customer is conducting a transaction, the data used to evaluate if the customer qualifies to receive an offer of a financial product will always be the latest available data. Additionally, one important advantage of the present invention is the ability of the organization making the offer to immediately receive a response to the offer without the need to re-check the data relied upon to make the offer after receipt of a positive response. Also, since the offer of the financial product is determined without the initiation of the customer filling out an application form, in the event the customer does not qualify for an offer, they are not aware of such denial. Further, because the initiation of the qualification process of the present invention is over a network, and the financial product offered is immediately usable, the financial institution offering the financial product has the ability to redirect a customer to utilize their financial product, as opposed to the financial product (i.e., credit card) that the customer intended to use to complete the transaction. The present invention accomplishes this by determining if a customer qualifies for an offer of a financial product in real-time (i.e., while the customer is conducting a transaction).

Although the present invention has been described in relation to particular embodiments thereof, many other variations and modifications and other uses will become apparent to those skilled in the art. It is preferred, therefore, that the present invention be limited not by the specific disclosure herein, but only the gist and scope of the disclosure.

What is claimed is:

1. A method of offering a financial product to a customer while the customer is conducting an transaction through a web site, the method comprising:
    receiving customer identification information input by the customer to facilitate the transaction over a network connection;
    performing a credit review process comprising:
        retrieving data related to the identification information using at least a portion of the identification information; and
        determining if the customer qualifies to receive an offer of the financial product based at least in part on the retrieved data;
    relaying information for the offer of the financial product to the web site over the network connection if the customer qualifies to receive the offer; and
    presenting the offer to the customer through the web site before the transaction is complete,
    wherein the customer is unaware of the credit review process it the customer does not qualify to receive the offer.

2. The method of claim 1, wherein the acts of receiving, retrieving, determining, relaying, and presenting occur in real-time, in parallel to the customer conducting the transaction on the web site.

3. The method of claim 1, wherein the identification information is received directly from the customer.

4. The method of claim 1, wherein the identification information is received from an entity other than the customer.

5. The method of claim 4, wherein the entity is a merchant associated with a vendor web site that sells products or services.

6. The method of claim 1, wherein the identification information is any information that personally identifies the customer.

7. The method of claim 6, wherein the identification information is selected from the group consisting of name, address, social security number, account identification number, password, computer identification tag, and any combination thereof.

8. The method of claim 1, wherein the retrieving step further comprises obtaining at least a portion of the data from external sources.

9. The method of claim 8, wherein the external sources include at least one credit bureau.

10. The method of claim 1, wherein the data includes credit related data.

11. The method of claim 10, wherein the credit related data contains FICO score data, delinquency data, credit activity data, and credit history data.

12. The method of claim 1, wherein the data includes demographic data.

13. The method of claim 12, wherein the demographic data contains information related to the residence, income, household make-up, and lifestyle of the customer.

14. The method of claim 1, wherein the customer is a person.

15. The method of claim 14, wherein the step of relaying information for the offer of the financial product to the web site over the network connection includes relaying information for the offer of at least one of a credit card, an overdraft product, a mortgage, a mortgage refinancing, an auto loan, a student loan, a personal loan, insurance, a home equity loan, a credit line extension, or margin lending products to the web site.

16. The method of claim 14, wherein the step of relaying information for the offer of the financial product to the web site over the network connection includes relaying information for the offer of one or more financial product packages, each of the financial product packages containing at least one of a credit card, an overdraft product, a mortgage, a mortgage refinancing, a tax grievance, an auto loan, a student loan, a personal loan, insurance, a home equity loan, a credit line extension, or margin lending products to the web site.

17. The method of claim 16 further comprising customizing each of the financial product packages for the customer based on the data.

18. The method of claim 17, further comprising grouping each of the financial product packages into conservative, normal, or flexible financial product packages.

19. The method of claim 1, wherein the customer is a business.

20. The method of claim 19, wherein the step of relaying information for the offer of the financial product to the web site over the network connection includes relaying information for the offer of at least one of a business loan, a business credit card, a benefits package, an escrow account, a payroll account, an overdraft product, an auto loan, insurance, a credit line extension, or margin lending products to the web site.

21. The method of claim 1, further comprising receiving a response to the offer.

22. The method of claim 21, wherein the step of receiving a response occurs in real-time.

23. The method of claim 22, wherein the response is an acceptance or a refusal of the offer of the financial product.

24. The method of claim 21, wherein the financial product is immediately usable by the customer for the transaction after receiving the acceptance of the offer without the need to gain qualify the customer based on the retrieved data.

25. The method of claim 24, further comprising: verifying the identity of the customer after receiving the acceptance of the offer before the financial product is immediately usable by the customer.

26. The method of claim 1, wherein the step of offering the financial product is performed by an entity other than that performing the step of determining if the customer qualifies for the offer.

27. The method of claim 1, wherein the steps of retrieving data and determining if the customer qualifies are performed by a financial institution.

28. The method of claim 27, wherein the financial institution is a bank, credit union or savings and loan organization.

29. A method of offering a financial product to a customer while the customer is engaged in an online transaction, the method comprising:
   maintaining a web site;
   receiving identification information from a customer engaged in the online transaction without the customer initiating an application for a financial product, the identification information provided by the customer to the web site;
   forwarding the identification information to a financial institution adapted to determine if the customer qualifies for the offer of the financial product;
   receiving an indication from the financial institution regarding the qualification of the customer; and
   offering the financial product through the web site to the customer if they qualify while the customer is still engaged in the online transaction;
   wherein the acts of receiving the identification information, forwarding the identification information, receiving the indication of qualification and offering the financial product occur while the customer is conducting a transaction with the web site.

30. The method of claim 29, wherein the identification information is any information that personally identifies the customer.

31. The method of claim 30, wherein the identification information is selected from the group consisting of name, address, social security number, account identification number, password, computer identification tag, and any combination thereof.

32. The method of claim 30, wherein the customer is one of a person and a business.

33. The method of claim 32, wherein the step of offering the financial product includes offering a credit card.

34. The method of claim 30, further comprising receiving a response to the offer.

35. The method of claim 34, wherein the step of receiving a response occurs before the completion of the transaction with the web site.

36. The method of claim 35, wherein the response is an acceptance or a refusal of the offer of the financial product.

37. The method of claim 36, wherein the transaction is a purchase transaction and the financial product is immediately usable by the customer to complete the purchase transaction after receiving the acceptance of the offer without the need to again qualify the customer based on the retrieved data.

38. The method of claim 37, further comprising: verifying the identity of the customer after receiving the acceptance of the offer and before the financial product is immediately usable by the customer.

39. The method of claim 29, wherein the financial institution is a bank, credit union, or savings and loan organization.

40. A system for offering a financial product to a customer, the system comprising:
   a network;
   a web site;
   a first interface coupled to the network that receives identification information regarding the customer, the identification information provided by the customer to the web site while the customer is conducting an online-transaction on the web site, the web site having a second interface that retrieves data related to the identification information;
   a processor coupled to the first interface and the second interface, the processor adapted to:
      determine if the customer qualifies for the offer of the financial product in response to the retrieved data;
      transmit the offer of the financial product to the customer via the network through the first interface if the customer qualifies; and
      present the offer to the customer via the first interface before the customer has completed the online transaction, wherein, if accepted, the customer may use the financial product to complete the transaction.

41. The system of claim 40, wherein the first interface receives the identification information via electronic transmission.

42. The system of claim 40, wherein the identification information is any information that personally identifies the customer.

43. The system of claim 42, wherein the identification information is selected from the group consisting of name, address, social security number, account identification number, password, computer identification tag, and any combination thereof.

44. The system of claim 40, wherein the second interface is further coupled to one or more external sources that contain at least a portion of the data related to the identification information.

45. The system of claim 44, wherein the external sources include at least one credit bureau.

46. The system of claim 40, wherein the data includes credit related data.

47. The system of claim 40, wherein the customer is a person.

48. The system of claim 47, wherein the financial product includes at least one of a credit card, an overdraft product, a mortgage, a mortgage refinancing, an auto loan, a student loan, a personal loan, insurance, a home equity loan, a credit line extension, or a margin lending product.

49. The system of claim 47, wherein the financial product includes one or more financial product packages, each of the financial product packages containing at least one of a credit card, an overdraft product, a mortgage, a mortgage refinancing, a tax grievance, an auto loan, a student loan, a personal loan, insurance, a home equity loan, a credit line extension or a margin lending product.

50. The system of claim 40, wherein the customer is a business.

51. The system of claim 50, wherein the financial product includes at least one of a business loan, a business credit card, a benefits package, an escrow account, a payroll account, an overdraft product, an auto loan, insurance, a credit line extension, or a margin lending product.

52. A system for offering a financial product to a customer, the system comprising:
a web site linked to the Internet, the web site being adapted to receive identification information from the customer in response to a request to perform a transaction, the identification information provided by the customer to the web site while the customer is conducting an online transaction on the web site;
a processor coupled to the web site; and
one or more databases linked to the processor, the one or more databases containing data related to the identification information of the customer;
wherein the processor is adapted to:
retrieve data related to the identification information from at least one of the one or more databases;
determine if the customer qualifies for an offer of the financial product in response to the retrieved data;
transmit the offer of the financial product to the customer via the web site if the customer qualifies; and
present the offer to the customer while the customer is still at the web site.

53. The system of claim 52, wherein the identification information is any information that personally identifies the customer.

54. The system of claim 53, wherein the identification information is selected from the group consisting of name, address, social security number, account identification number, password, computer identification tag, and any combination thereof.

55. The system of claim 52, wherein the database is an external database.

56. The system of claim 55, wherein the external database is a credit bureau database.

57. The system of claim 56, wherein the data includes credit related data.

58. The system of claim 52, wherein the customer is a person.

59. The system of claim 58, wherein the financial product includes at least one of a credit card, an overdraft product, a mortgage, a mortgage refinancing, an auto loan, a student loan, a personal loan, insurance, a home equity loan, a credit line extension, or a margin lending product.

60. The system of claim 58, wherein the financial product includes one or more financial product packages, each of the financial product packages containing at least one of a credit card, an overdraft product, a mortgage, a mortgage refinancing, a tax grievance, an auto loan, a student loan, a personal loan, insurance, a home equity loan, a credit line extension or a margin lending product.

61. The system of claim 52, wherein the customer is a business.

62. The system of claim 61, wherein the financial product includes at least one of a business loan, a business credit card, a benefits package, an escrow account, a payroll account, an overdraft product, an auto loan, insurance, a credit line extension, or a margin lending product.

63. The system of claim 52, wherein the processor is located within a financial institution.

64. The system of claim 63, wherein the financial institution is a bank, credit union, or a savings and loan organization.

65. A method of offering a financial product to a customer, the method comprising:
maintaining a web site;
receiving identification information from a customer conducting a transaction on the web site, the identification information including at least one of a name, an address, a social security number, an account identification number, a password, and a computer identification tag, the identification information-provided by the customer to the web site;
without notifying the customer, forwarding the identification information to a financial institution adapted to determine if the customer qualifies for an offer of the financial product, the financial product including at least one of a credit card, an overdraft product, a mortgage, a mortgage refinancing, an auto loan, a student loan, a personal loan, insurance, a home equity loan, a credit line extension and margin lending products;
receiving an indication from the financial institution regarding the qualification of the customer; and
offering the financial product through the web site to the customer in response to an indication that the customer qualifies;
wherein the acts of receiving the identification information, forwarding the identification information, receiving the indication of qualification and offering the financial product occur before the customer completes the transaction.

66. The system according to claim 52, wherein the transaction is a purchase transaction and, if accepted, the customer may use the financial product to complete the purchase transaction.

67. The system according to claim 4, wherein the entity is a membership based organization associated with the website.

* * * * *

UNITED STATES PATENT AND TRADEMARK OFFICE
CERTIFICATE OF CORRECTION

| | | |
|---|---|---|
| PATENT NO. | : 7,472,088 B2 | Page 1 of 1 |
| APPLICATION NO. | : 09/872447 | |
| DATED | : December 30, 2008 | |
| INVENTOR(S) | : James W. Taylor et al. | |

It is certified that error appears in the above-identified patent and that said Letters Patent is hereby corrected as shown below:

Claim 1, at column (14), line 21 "it" should be changed to --if--; and
Claim 24, at column (15), line 33 "gain" should be changed to --again--.

Signed and Sealed this

Seventeenth Day of March, 2009

JOHN DOLL
*Acting Director of the United States Patent and Trademark Office*